(12) United States Patent
Kishkovich

(10) Patent No.: US 6,610,128 B2
(45) Date of Patent: Aug. 26, 2003

(54) FILTERS EMPLOYING POROUS STRONGLY ACIDIC POLYMERS

(75) Inventor: Oleg Kishkovich, Greenville, RI (US)

(73) Assignee: Extraction Systems, Inc., Franklin, MA (US)

( * ) Notice: Subject to any disclaimer, the term of this patent is extended or adjusted under 35 U.S.C. 154(b) by 0 days.

(21) Appl. No.: 10/178,424

(22) Filed: Jun. 24, 2002

(65) Prior Publication Data

US 2002/0166450 A1 Nov. 14, 2002

Related U.S. Application Data

(62) Division of application No. 09/378,180, filed on Aug. 20, 1999, now Pat. No. 6,447,584.
(60) Provisional application No. 60/097,215, filed on Aug. 20, 1998.

(51) Int. Cl.$^7$ ............................................. B01D 53/02
(52) U.S. Cl. ........................................ 96/153; 55/524
(58) Field of Search ....................... 95/90, 285, 286, 95/287; 96/153, 154, 134; 55/486, 487, 522, 524, 527, 528

(56) References Cited

U.S. PATENT DOCUMENTS

| | | |
|---|---|---|
| 3,019,127 A | 1/1962 | Czerwonka et al. |
| 3,409,691 A | * 11/1968 | Small |
| 3,607,706 A | 9/1971 | Eisenmann et al. |
| 3,998,988 A | 12/1976 | Shimomai et al. |
| RE29,410 E | 9/1977 | Yoshino |
| 4,072,793 A | 2/1978 | Watanabe et al. |
| 4,204,011 A | 5/1980 | Tanabe et al. |
| 4,224,415 A | 9/1980 | Meitzner et al. |
| 4,313,832 A | 2/1982 | Shimizu et al. |
| 4,322,230 A | 3/1982 | Schoen et al. |
| 4,629,479 A | 12/1986 | Cantoni |
| 4,852,133 A | 7/1989 | Ikeda et al. |
| 4,981,501 A | 1/1991 | Von Blucher et al. |
| 5,039,321 A | 8/1991 | Satoh et al. |
| 5,133,864 A | 7/1992 | Vaughn et al. |
| 5,166,530 A | 11/1992 | McCleary |
| 5,204,055 A | 4/1993 | Sachs et al. |
| 5,290,345 A | 3/1994 | Osendorf et al. |
| 5,300,604 A | 4/1994 | Nasman et al. |

(List continued on next page.)

FOREIGN PATENT DOCUMENTS

| | | |
|---|---|---|
| DE | 19859788 | 3/2000 |
| EP | 0335034 | 10/1989 |
| EP | 0398847 | 11/1990 |
| EP | 0584030 | 2/1994 |
| JP | WO 00/07696 | 2/2000 |
| WO | WO 00/25896 | 5/2000 |

OTHER PUBLICATIONS

Kishkovich, O., et al., "An Accelerated Testing Technique for Evaluating Performmance of Chemical Air Filters for DUV Photolithographic Equipment," SPIE Vol. 3677, pp. 857–865 (part of the SPIE Conference on Metrology, Inspection and Process Control for Microlighography XIII, Santa Clara, CA) (Mar. 1999).

*Primary Examiner*—Duane S. Smith
(74) *Attorney, Agent, or Firm*—Bowditch & Dewey, LLP

(57) ABSTRACT

A clean, high efficieny, low pressure drop, adsorptive filter material that is porous and includes an acidic functional group. The filter can include, for example, a non-woven filter composite has a porous sulfonated divinyl benzene styrene copolymer beads having sulfonic acid functional side groups. The non-woven filter is used to remove molecular bases, including ammonia, organic amines, inides, aminoalcohols, alcoholoamines from the atmosphere used in semiconductor fabrication and other processes that require uncontaminated gaseous environments of high quality.

14 Claims, 8 Drawing Sheets

U.S. PATENT DOCUMENTS

| | | |
|---|---|---|
| 5,306,321 A | 4/1994 | Osendorf |
| 5,328,758 A | 7/1994 | Markell et al. |
| 5,340,656 A | 8/1994 | Sachs et al. |
| 5,387,380 A | 2/1995 | Cima et al. |
| 5,399,377 A | 3/1995 | Economy et al. |
| 5,430,303 A | 7/1995 | Matsumoto et al. |
| 5,462,485 A | 10/1995 | Kinkead |
| 5,486,410 A | 1/1996 | Groeger et al. |
| 5,582,865 A | 12/1996 | Rezuke et al. |
| 5,605,746 A | 2/1997 | Groeger et al. |
| 5,607,647 A | 3/1997 | Kinkead |
| 5,616,169 A | 4/1997 | de Ruiter et al. |
| 5,626,820 A | 5/1997 | Kinkead et al. |
| 5,647,356 A | 7/1997 | Osendorf et al. |
| 5,685,895 A | 11/1997 | Hagiwara et al. |
| 5,743,927 A | 4/1998 | Osendorf |
| 5,753,345 A | 5/1998 | Kuma et al. |
| 5,772,884 A | 6/1998 | Tanaka et al. |
| 5,783,608 A | 7/1998 | Sugo et al. |
| 5,807,424 A * | 9/1998 | de Ruiter et al. |
| 5,833,726 A | 11/1998 | Kinkead et al. |
| 5,834,114 A | 11/1998 | Economy et al. |
| 5,856,198 A | 1/1999 | Joffe et al. |
| 5,890,367 A | 4/1999 | You et al. |
| 5,906,429 A | 5/1999 | Mori et al. |
| 5,944,878 A | 8/1999 | Lindhe |
| 6,056,805 A | 5/2000 | Litwin et al. |
| 6,352,579 B1 | 3/2002 | Hirata et al. |
| 6,447,584 B1 * | 9/2002 | Kishkovich et al. |
| 2002/0078828 A1 * | 6/2002 | Kishkovich et al. |

* cited by examiner

FILTERS EMPLOYING POROUS STRONGLY ACIDIC POLYMERS

CROSS REFERENCES TO RELATED APPLICATIONS

The present application is a divisional of U.S. patent application Ser. No. 09/378,180, filed Aug. 20, 1999, now U.S. Pat. No. 6,447,584, which claims the benefit of U.S. Provisional Application No. 60/097,215, filed on Aug. 20, 1998, the entire teachings of which are incorporated herein by reference.

BACKGROUND OF THE INVENTION

In this age of increased air pollution, the removal of chemicals from the air we breathe is a concern of everyone. In addition, in the fabrication electronic materials and of devices such as semiconductors, there is a requirement for uncontaminated air of high quality.

Gas phase filtration is commonly accomplished using activated carbon manufactured in various ways. One approach uses a carbon/adhesive slurry to glue the carbon to the substrate. The adhesive decreases carbon performance by forming a film on its surface.

A second approach involves carbonizing an organic based web by heating, followed by carbon activation. This material is expensive and has relatively low adsorption capacity.

A third approach involves forming a slurry of carbon powders and fibers into sheets by a process analogous to a wet papermaking process. This material has a medium-to-high cost, and has an undesirable high pressure drop. Moreover, chemically impregnated carbon particles cannot be efficiently used in conjunction with an aqueous process, as the aqueous nature of the process either washes away the chemical used to impregnate the carbon, or reacts undesirably with the impregnating or active chemical groups thereby rendering it inoperative. In general, however, filter materials which do not incorporate chemically active groups perform far less effectively than those which do include chemically active groups.

None of these approaches fully achieve the desired properties which provide a clean, cost effective, high efficiency, low pressure drop, adsorptive composite.

SUMMARY OF THE INVENTION

The present invention comprises a clean, cost effective, high efficiency, low pressure drop, adsorptive, filter comprising a high surface area, highly acidic chemically impregnated adsorbent. A preferred embodiment of the invention can employ a non-woven composite material having acidic functional groups that bind to airborne bases. The invention can be used in lithography systems which employ materials that are sensitive to impurities, such as molecular bases present in the air circulating through semiconductor wafer processing equipment. A large number of bases including ammonia, NMP, triethylamine pyridine, and others, can be maintained at concentrations below 2 ppb in a tool cluster filtered with the present invention. The invention also includes methods for forming the filter comprising, for example, the dry application of an active adsorbent to a non-woven carrier material, which is then heated and calendered with cover sheets.

In a preferred embodiment of this invention the non-woven carrier materials can be polyester non-wovens, and the adsorbent can include sulfonated divinyl benzene styrene copolymer. Another preferred embodiment employs carboxylic functional groups. The acidic groups have at least 1 milliequivalent/gram acidity level or higher and preferably at least 4.0 milliequivalents/gram or higher. The polymers used are porous, preferably having a pore size in the range of 50–400 angstroms and a surface area of 20 $m^2$/g or higher.

The dry processing of a non-woven polyester batting allows for even distribution of adsorbent particles throughout the depth of the polyester batting. This provides an increased bed depth at a very low pressure drop, which is highly desirable since a twofold increase in bed depth can increase the filter's breakthrough time (time to failure) fourfold when using these thin fabric based sulfonic beds.

Thus, the invention provides a clean, cost effective, high efficiency, low pressure drop, adsorptive non-woven filter composite, and a method for forming said composite. The novel filter composite is particularly useful for the removal of base contaminants in an air stream, which contaminants can be gaseous or vaporous. Particulates will also be removed if greater than the pore size of the filter. The filter has a service life of at least 12 months with a pressure drop to reduce power consumption and minimize impact on the systems operation. For example, a high pressure drop filter can require a longer time for a lithography system to equilibrate the temperature and humidity after filter replacement.

In an alternative embodiment, the filter uses both sulfonated divinyl benzene styrene copolymer and an activated carbon as the adsorbent. Activated carbon is discussed in greater detail in U.S. Pat. No. 5,582,865 entitled "Non-Woven Filter Composite", issued Dec. 10, 1996 with Rezuke, et al. as inventors. The entire contents of this patent is incorporated herein by reference. The filter in this preferred embodiment has two (or more) layers, one of activated carbon and one of sulfonated divinyl benzene styrene copolymer beads. Additionally, two or more materials can be mixed to provide the filter system of the present invention.

In another preferred embodiment a synthetic carbon material, such as that described in U.S. Pat. No. 5,834,114 entitled "Coated aborsbent fibers", issued Nov. 10, 1998 with Economy, et al. as inventors, the contents of which are incorporated herein by reference, can be coated with the materials of the present invention to provide a porous acidic filter in accordance with the invention.

A detection system and method of use for determining when the filter needs to be replaced by detecting base contaminants in air is described in U.S. Pat. No. 6,207,460 entitled "Detection of Base Contaminants in Gas Samples", issued Mar. 27, 2001 with Oleg Kishkovich, et al. as inventors. Also U.S. Pat. No. 6,096,267 entitled "Detecting of Base Contaminants", issued Aug. 1, 2000 with Oleg Kishkovich, et al. as inventors and U.S. Pat. No. 6,296,806 entitled "Protection of Semiconductor Fabrication and Similar Sensitive Processes", issued Oct. 2, 2001 with Oleg Kishkovich, et al. as inventors can also be used with the present invention. These patents disclose the protection of a DUV lithography processes using chemically amplified photoresists which are sensitive to amines in the air. These patents are incorporated in the present application in their entirety by reference.

A preferred embodiment of a method of fabricating a filter element having a large surface area and the desired flow characteristics involves the use of a powdered material that is deposited in sequential layers one on top of the other. Following the deposit of each layer of powdered material, a binder material is delivered onto each layer of powdered material using a printing technique in accordance with a computer model of the three dimensional filter element being formed. Following the sequential application of all of the required powder layers and binder material to form the part in question, the unbound powder is appropriately removed, resulting in the formation of the desired three dimensional filter element. This technique provides for the fabrication of complex unitary or composite filter elements having high surface area that are formed with a very high degree of resolution.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
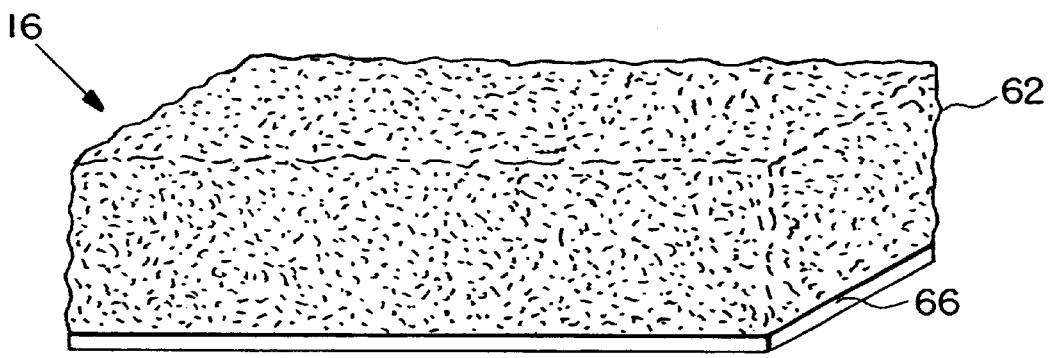
FIG. 1 is a perspective view of the apparatus of this invention before heating and calendaring.

Referring to FIG. 1, a portion of a composite 16 is shown. The composite 16 has a cover sheet 66 and a middle layer 62. In a preferred embodiment, the cover sheet 66 is a polyester non woven having a binder to fiber ratio of 55/44 and a thickness of 0.024 inches. The middle layer 62 is air-laid polyester non woven having a thickness of 0.25 inches and binder to fiber ratio of 35%/65%. The composite is impregnated with a porous acidic polymer material that binds readily with molecular bases in air flowing through the filter.

Figure 2A:
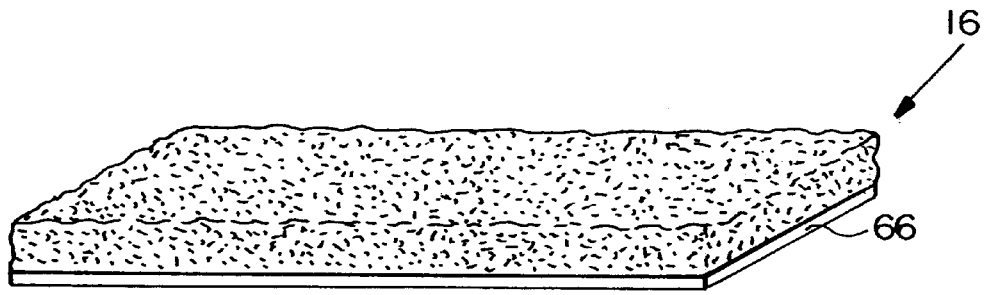
FIG. 2A is a perspective view of the apparatus of this invention after heating and calendaring.
Figure 2B:
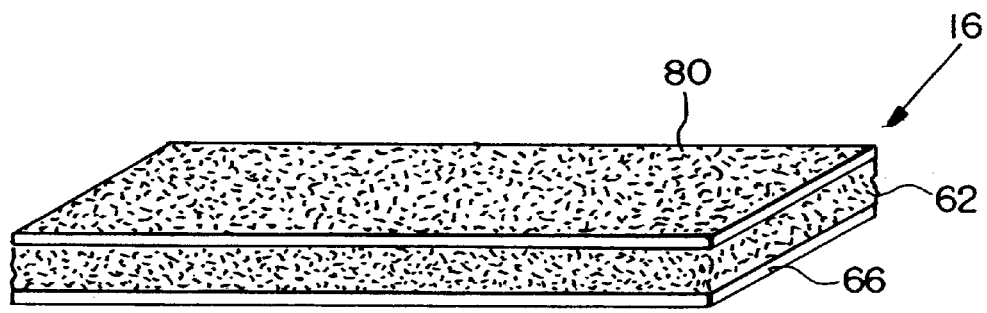
FIG. 2B is a perspective view of the apparatus of this invention after heating and calendaring with a cover sheet.

The structure of FIG. 2A can be used directly in this form as the composite filter element. The composite 16, in a preferred embodiment employs a second cover sheet 80, provided on the surface of middle layer 62, opposite to the first cover sheet 66 backing 12, as shown in FIG. 2B. Alternatively, a second cover sheet 14a, can be provided over the backing layer 12, as shown in FIG. 2C. The cover sheet can be a filtering or non-filtering non-woven polyester, polyamide or polypropylene material or other similar materials. If the cover sheet is a filtering material, it serves to provide some filtering of the air entering the composite structure for removal of particulate materials in the air stream. The cover can also serve to retain the porous acidic polymer material such as a sulfonated divinyl benzene styrene copolymer, which can be in bead form, within the middle layer or batting 62. The cover sheets can also be chemically inert materials such as polypropylene.

The composite 16, can be contained within any suitable container or frame work for installation in an intended position for filtering operation, typically in the form of a removable or replaceable filter element. For many purposes, it is preferable to increase the surface area of the filter material exposed to an incident air flow, and for this purpose the composite can be pleated to provide the increased surface area.

Figure 3A:
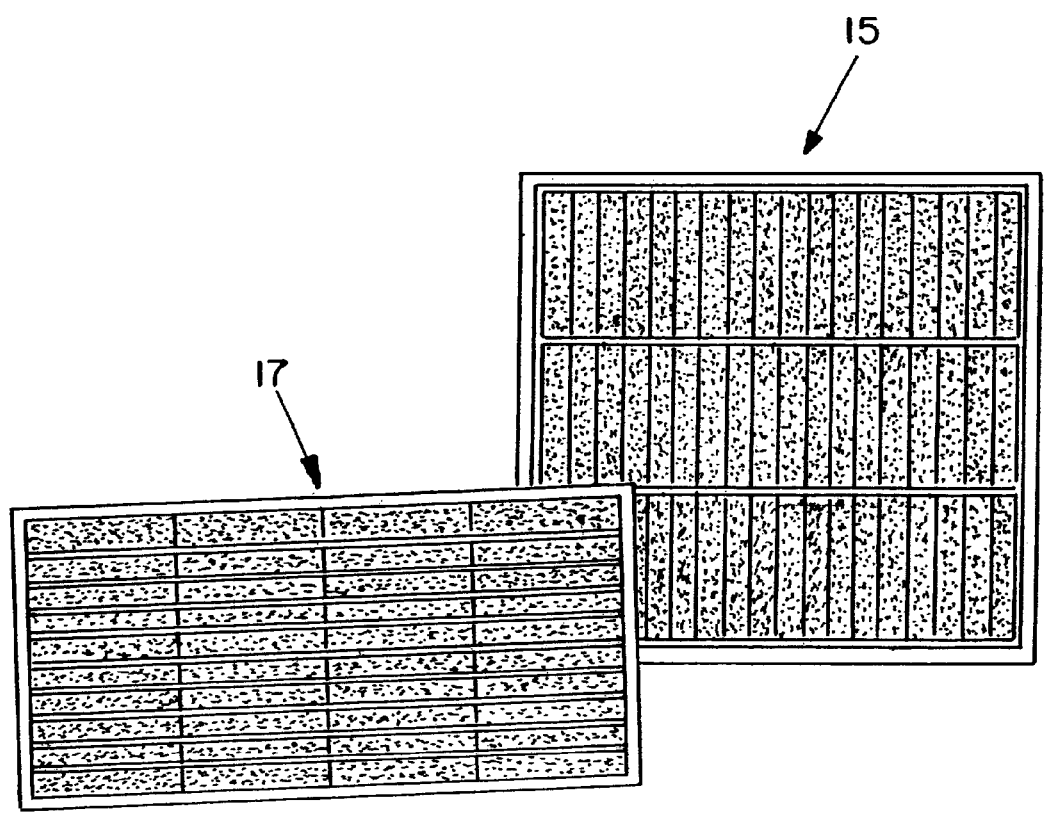
FIG. 3A is a perspective view of the apparatus of this invention in a square or rectangular containment structure showing the creases of the pleated structure.
Figure 3B:
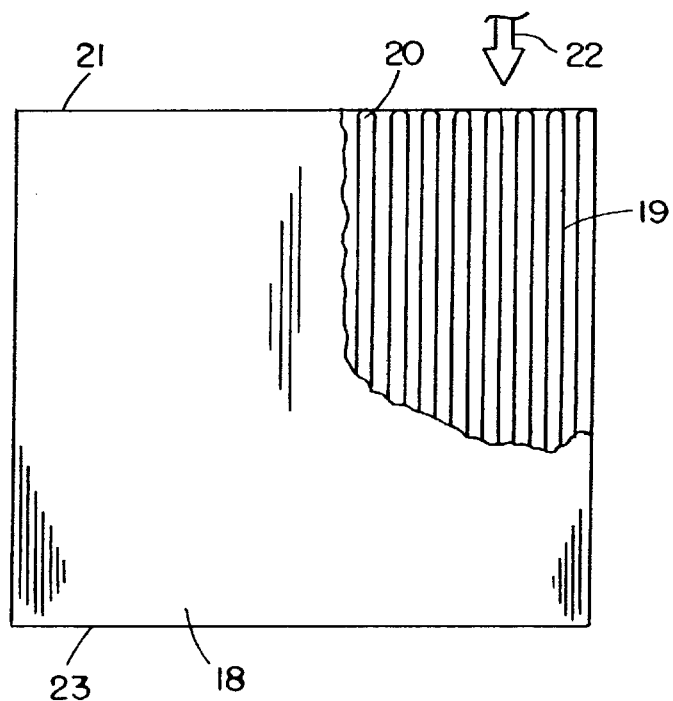
FIG. 3B is a top view of the apparatus of this invention showing its pleated structure.

One embodiment is shown in FIG. 3A, in which the composite material forms an air filter 15 or 17. The filter material is pleated into an accordion like structure 19 as shown in FIG. 3B, contained within a square or rectangular container 18, having a front 21, and back 23, which are open to an air stream shown by arrow 22. The pleating 20 is substantially perpendicular to the air flow. FIG. 3A shows the structure in a front or back view. FIG. 3B shows a cutaway top view of a filter structure.

Figure 4:
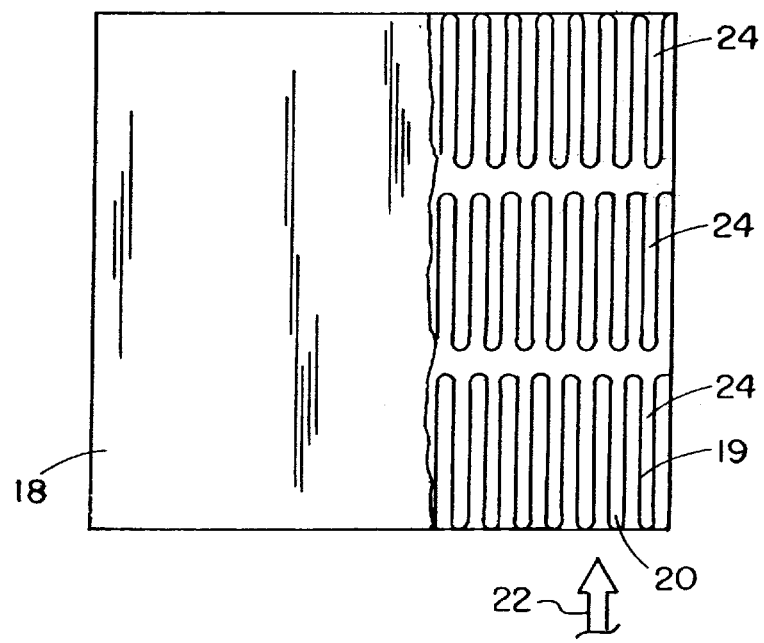
FIG. 4 is a top view of the apparatus of this invention with a high first pass efficiency multi-pleat pack panel filter in a square or rectangular containment structure.

An alternative embodiment is shown in FIG. 4 wherein a plurality of pleated composite elements 24, are sequentially disposed within container 18, to provide a multi-stage filter through which the air can pass. As in the above embodiment, the pleats 20, of the elements 24, are substantially perpendicular to the direction of air flow 22.

Figure 5A:
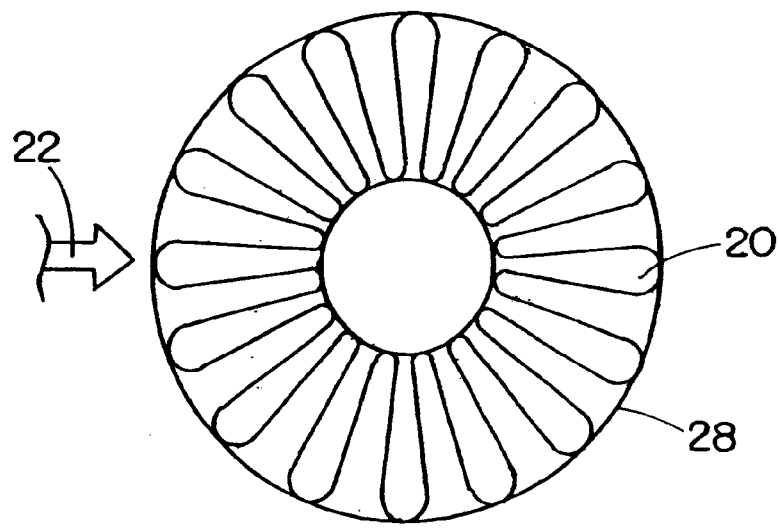
FIG. 5A is a top view of the apparatus of this invention in a radially pleated cylindrical containment structure.
Figure 5B:
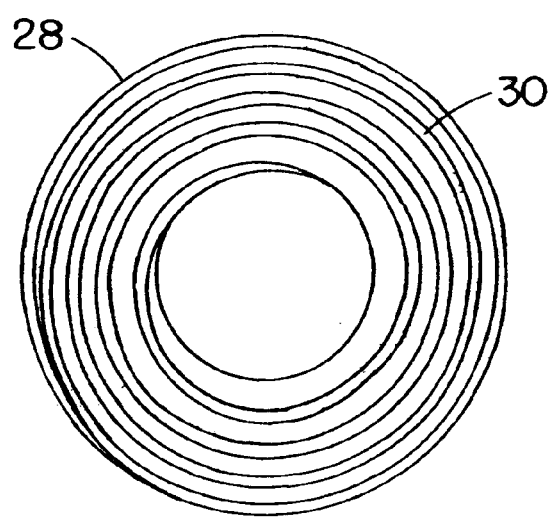
FIG. 5B is top view of the apparatus of this invention in a media-wrapped cylindrical filter.

A further embodiment is shown in FIG. 5A, wherein the composite structure 16, is disposed in a cylindrical configuration and retained within a cylindrical container 28. The pleats 20, are as described above, substantially perpendicular to a radially directed air flow. A further embodiment is shown in FIG. 5B wherein the composite structure is wound in a spiral configuration 30, contained within a generally cylindrical container 28.

In a preferred embodiment, adsorbent particles are evenly distributed throughout the non-woven or fiber matrix or polyester batting. An example of an adsorbent particle includes but is not limited to sulfonated divinyl benzene styrene copolymer.

In a preferred embodiment, the ion exchange strongly acidic preliminary catalyst has the important properties including a particle size of between 0.3 and 1.2 mm, a porosity of approximately 0.30 ml/g, and an average pore diameter of 250 Å. The catalyst preferably has a higher porosity of up to 300 ml/g, or, higher. In addition in a preferred embodiment has the properties of concentration of acid sites of approximately 1.8 meq/ml and surface area of 45 $m^2$/g. One such catalyst is sold under the tradename AMBERLYST® 15DRY or AMBERLYST® 35DRY by Rohm and Haas.

Overall, the dry processing of the fiber matrix, which includes the combination of the fluidized bed sulfonated divinyl benzene styrene copolymer deposition process, the inherent stratification of the batting's density, and the even distribution of the sulfonated divinyl benzene styrene copolymer particles as well as stratification of the sulfonated divinyl benzene styrene copolymer particle size, allows for a fabric architecture having an increased bed depth at a very low pressure drop, which is highly desirable due to its high first pass efficiency coupled with its low operating cost.

The term "efficiency" as employed herein is defined by the formula X-Y/X wherein X is the upstream concentration of pollutant, and Y is the downstream concentration of pollutant.

It is recognized that the filter can have a mix of an activated carbon and the preliminary catalyst material discussed above. This combination has sufficient porosity and strongly acidic groups to provide easy permanent removal of medium and strong bases and sufficient retention of weak bases from the airborne base contaminants. The filter can also include a porous polymer material.

The filter as described is employed in filtering the air in environments such as semiconductor fabrication systems where there is a requirement for uncontaminated air of high quality.

Figure 6:
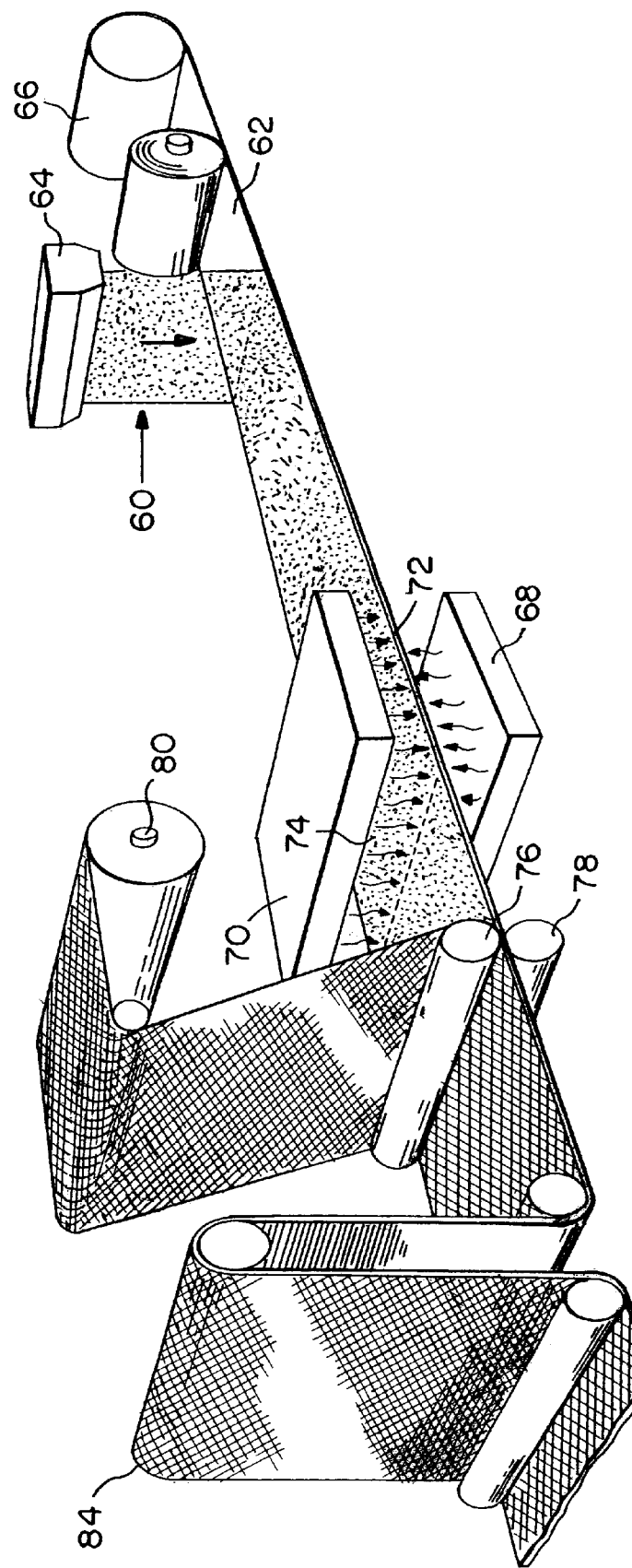
FIG. 6 is a perspective view of a process of producing a filter of the invention.

Referring to FIG. 6, the middle air-laid polyester non woven lay 62 is collated to a cover sheet 66. The adsorbent particles 60 are positioned on a fiber matrix 62 from a fluidized bed 64. The sulfonated divinyl benzene styrene copolymer particles 60 are evenly stratified throughout the depth of the batting 62. As discussed above, an increased bed depth of adsorbent particles distributed throughout the batting is highly desirable as it increases residence time, increases exposure of the adsorbent particle surfaces, provides a low pressure drop, as well as substantially increasing the lifetime of the filter.

The adsorbent particles 60 distributed in the matrix 62 are then heated, preferably using two zones 68, 70 of infrared energy at different wavelengths. The batting 62 is heated to an overall average temperature of between 250° and 350° F.

The infrared energy causes the adsorbent particles to adhere to the batting at points where the particles contact the batting. This procedure avoids the necessity of raising the temperature of the entire batting to a point at, or near, the melting point of the polyester batting, which could cause the batting to melt and collapse thereby encasing the particles and destroying their chemical activity.

The batting 62 is then calendared using a pair of calender rolls 76,78. The first of these rolls 76 (Heated Steel Roller) can be temperature controlled which allows the heating and calendering steps to be carried out at a steady temperature of around 140°, and prevents overheating and subsequent melting of cover sheet and prevents over calendering of the fabric. The second roll, roll 78, is a rubber roll having a durometer that avoids crushing of the adsorbent particles.

In FIG. 6, Middle Layer (62) can have the following specifications: Air-Laid Polyester Non Woven 100% 15 Denier Fiber. The Binder consists of a Fiber Ratio of 35% to 65%, Binder to Fiber. The weight is 6.5 oz. per linear yard at a 52 inch width. The thickness is 0.25 inches.

The cover sheet (66 and 80) can have the following specifications: Polyester Non Woven 100% 2.25 Denier Fiber. The Binder consists of a Fiber Ratio of 55 g/45 g. The thickness is 0.024 inches and the weight is 1.75 oz./yd$^2$.

Furthermore, when the temperature controlled roller 76 is used, the pressure at which the batting is 2000 pounds across the 26 inch distance. Higher calendaring pressures can crush the particles particularly when those particles are activated carbon based, thereby forming dust, which cannot be retained in the filter composite and can consequently pass into the gas stream.

In addition, a synthetic non-woven cover sheet 80, which helps to maintain the sulfonated divinyl benzene styrene copolymer in the batting, may be calendared with the batting 62, as discussed above. After the filter is formed, gussets or spacers are placed in the filter. The filter is sealed into a metal box.

Optionally, the material may be conducted over an upper roller 84 to facilitate cooling the material prior to further processing. The method of manufacture for an activated carbon filter is described in detail in U.S. Pat. No. 5,582,865 titled "Non-Woven Filter Composite". The entire contents of this patent is incorporated herein by reference.

While the above described method is a preferred method of creating the filter, it is recognized that other techniques can be used. Some of these techniques include those developed by Hoechst such as that described in U.S. Pat. No. 5,605,746, the entire contents of which is incorporated herein by reference or KX Media. The common feature in all these methods are the incorporation of a chemically active sorbent into a porous media structure.

Figure 7:
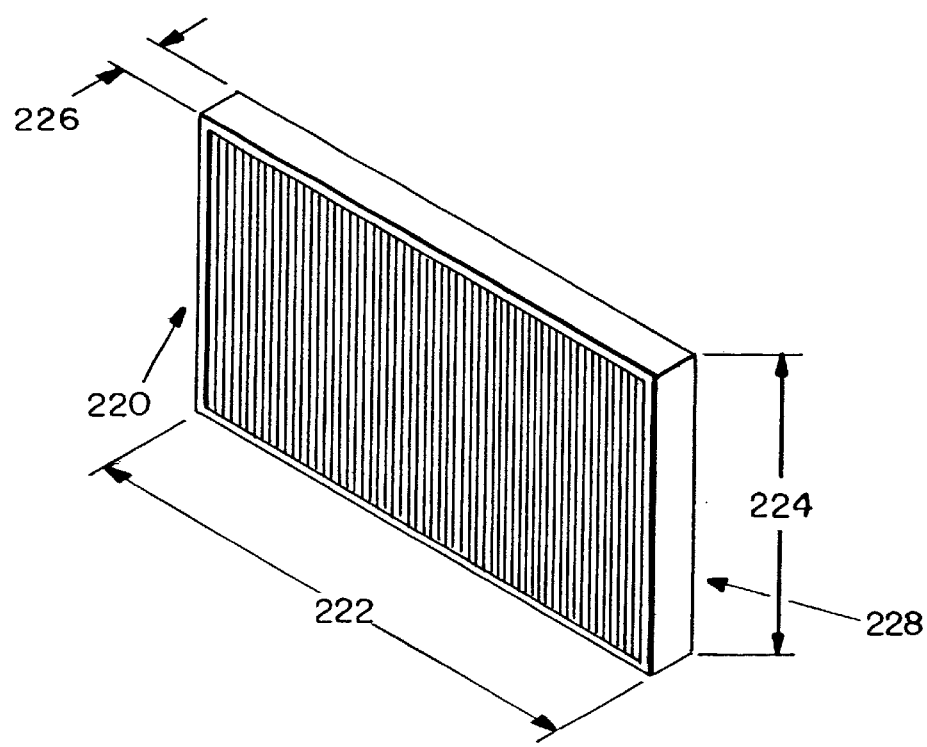
FIG. 7 is a pleated filter made in accordance with the invention.

A pleated filter structure 220 using the porous acidic polymer of the present invention is illustrated in FIG. 7. This is a pleated system open on both sides of a rectangular frame 228 with a length 222, width 224 and depth such that it can be used as a replacement filter in stack filter systems. The filter has a removal efficiency of over 99% at 1000 ppb.

Figure 8:
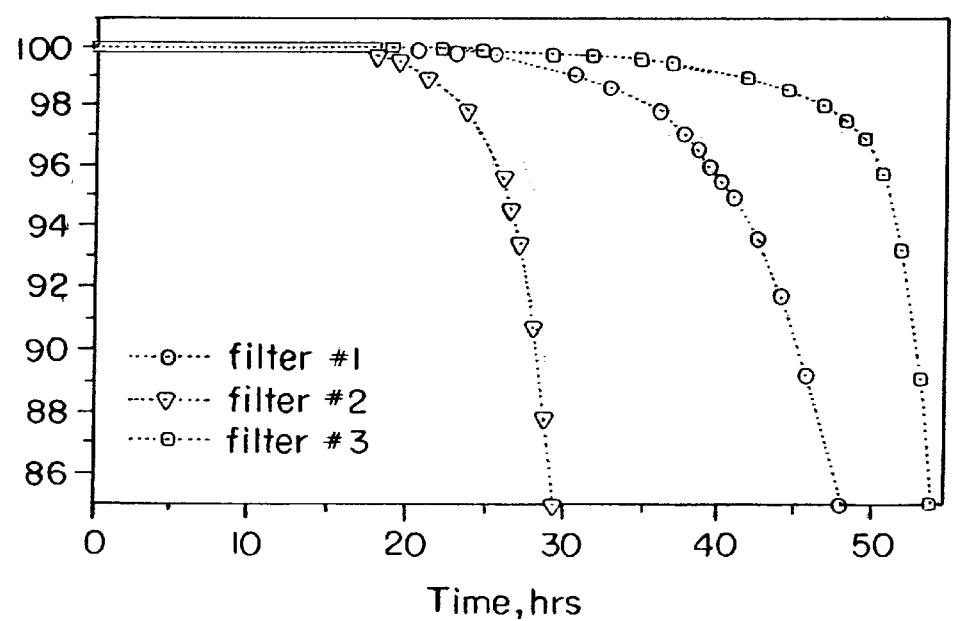
FIG. 8 is a graphical illustration comprising the base removal efficiency of filters previously available and a filter made in accordance with the invention.

FIG. 8 graphically illustrates the removal efficiency for three different filters. The graphs represent removal efficiency as a function of time at 20 ppm of $NH_3$ concentration upstream from the filter. Filter size is ~12"×12"×6". Air flow is ~100 cfm. Considering service life data only, it appears that filter #3 performed best. However, if additional data is considered, the conclusion is not so simple. Pressure drop of filter #1 was 0.2" WC; for filter #2 was 0.3" WC; and for filter #3 was 1.0" WC. Filters #1 and #2 are very close to tool manufacturer's specifications, but #3 creates an excessive pressure drop that interferes with tool's proper ECU functioning. Excessive pressure drop is undesirable for multiple reasons. For example, it increases fan load and power consumption, reduces airflow through the tool and positive pressure inside the enclosure. Thus filter #1 made in accordance with the present invention provided a substantial improvement in service life while providing a pressure drop that is compatible with tool operation.

Another preferred embodiment of the invention involves the fabrication of high surface area filter elements using a three dimensional printing technique as described in U.S. Pat. Nos. 5,204,055, 5,340,656, and 5,387,380, the entire contents of these patents being incorporated herein by reference.

Figure 9:
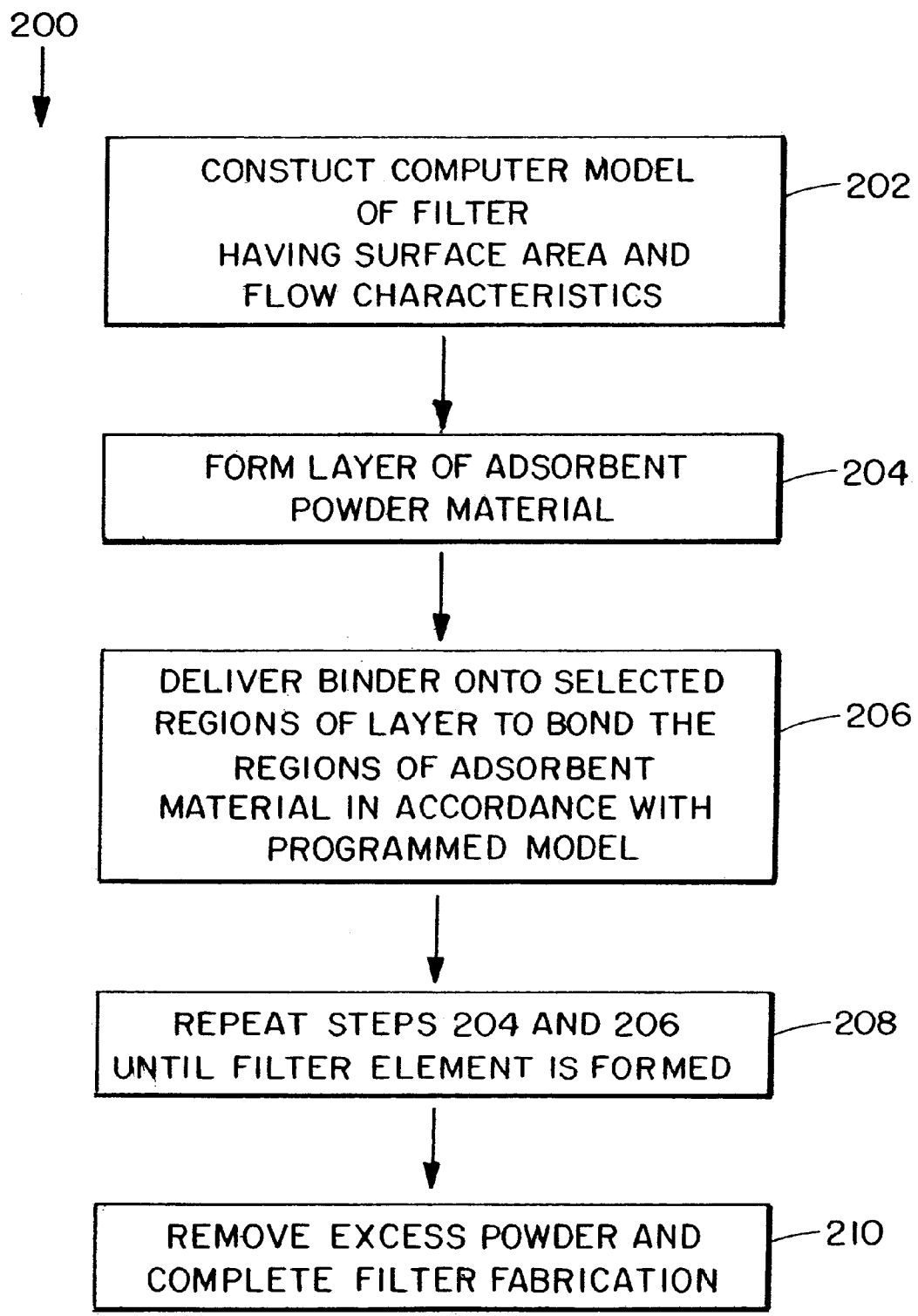
FIG. 9 is a process for fabricating a filter in accordance with a preferred embodiment of the invention.
Figure 10:
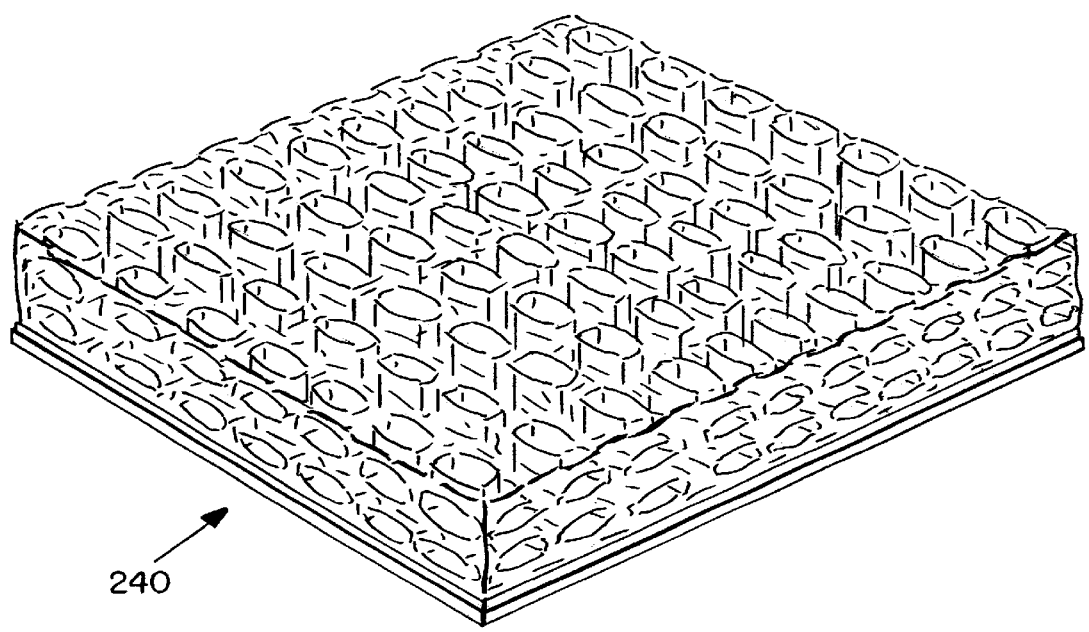
FIG. 10 illustrates an example of a three dimensional filter fabricated in accordance with the process.

Such a method of fabrication of a filter element is illustrated in connection with FIG. 9. The process 200 includes forming a three dimensional model 202 of the filter element such that the dimensions are well defined. The first layer of the powder material used to form the filter is placed 204 the printer apparatus. A binder is then delivered 206 onto the powder material resulting in the binding of selected regions thereof. Steps 204 and 206 are repeated a number of times until the high surface area filter is formed. Finally, the excess material is removed 210. An illustrative example of a high surface area filter made in accordance with this method is shown in the example 240 of FIG. 10. The binder can be an acid polymerizable or acid cross linkable liquid.

While this invention has been particularly shown and described with references to preferred embodiments thereof, it will be understood by those skilled in the art that various changes in form and details may be made therein without departing from the spirit and scope of the invention as defined by the appended claims.

What is claimed:

1. A method of filtering air for a semiconductor processing facility needing uncontaminated air, comprising the steps of:
   providing a filter including a non-woven carrier material having thermo-plastic fibers and having distributed therein adsorbent particles of a sulfonated divinyl benzene styrene
   flowing air through the filter with the surfaces of said distributed adsorbent particles being exposed for contact with passing air; and
   removing the base contaminants from the passing air with the sulfonated material.

2. A method for filtering molecular base contaminants from air in semiconductor processing equipment comprising passing air through a filter element comprising alternating layers of a powder material and a binder.

3. The method of claim 2 wherein the binder includes an acid-polymerizable or acid-cross-linkable liquid.

4. The method of claim 3 wherein the powder material includes divinyl benzene styrene copolymer.

5. The method of claim 4 wherein the air is delivered to a deep-ultraviolet photolithography tool after passing though the filter element.

6. The method of claim 2 further comprising the step of removing the base contaminants from the passing air such that the concentration of basic amines is less than about 2 ppbv.

7. The method of claim 1 wherein the thermo-plastic fibers are fibers of a polyester material.

8. The method of claim 1, further comprising a cover sheet having thermo-plastic fibers, the thermo-plastic fibers having a higher fiber density relative to the fiber density of the resultant composite of the non-woven carrier material and cover sheet.

9. The method of claim 1 further comprising delivering filtered air to a photolithography tool.

10. The method of claim 1 further comprising reducing a concentration of basic amines from the passing air with the filter.

11. The method of claim 1, further comprising providing a filter having a pleated structure.

12. The method of claim 1 further comprising providing a second cover sheet.

13. The method of claim 1 further comprising providing a non-woven carrier material that is porous, the pore size being in a range of 50–400 angstroms.

14. The method of claim 1 further comprising providing a filter having a plurality of pleated filter elements in sequence.

* * * * *

UNITED STATES PATENT AND TRADEMARK OFFICE
CERTIFICATE OF CORRECTION

PATENT NO. : 6,610,128 B2
DATED : August 26, 2003
INVENTOR(S) : Oleg Kishkovich, Robert W. Rezuke and Devon Kinkead It is certified that error appears in the above-identified patent and that said Letters Patent is hereby corrected as shown below:

Title page,
Item [75], Inventors, please delete the inventor "Oleg Kishkovich, Greenville, RI (US)" and replace with -- Oleg Kishkovich, Greenville, RI (US), Robert W. Rezuke, North Grafton, MA (US) and Devon Kinkead, Holliston, Ma (US) --

Column 7,
Line 5, please delete "divinyl benzene styrene" and insert -- divinyl benzene styrene copolymer material; --

Signed and Sealed this

Twenty-seventh Day of July, 2004

JON W. DUDAS
*Acting Director of the United States Patent and Trademark Office*